(12) United States Patent
Knauss

(10) Patent No.: US 6,250,559 B1
(45) Date of Patent: Jun. 26, 2001

(54) THERMOSTATIC WATER MIXER

(75) Inventor: Erwin Knauss, Gundelsheim (DE)

(73) Assignee: Honeywell AG (DE)

( * ) Notice: Subject to any disclaimer, the term of this patent is extended or adjusted under 35 U.S.C. 154(b) by 0 days.

(21) Appl. No.: 09/381,403

(22) PCT Filed: Sep. 19, 1998

(86) PCT No.: PCT/EP98/01612

§ 371 Date: Sep. 17, 1999

§ 102(e) Date: Sep. 17, 1999

(87) PCT Pub. No.: WO98/43142

PCT Pub. Date: Oct. 1, 1998

(30) Foreign Application Priority Data

Mar. 21, 1997 (DE) ............................................. 197 11 760

(51) Int. Cl.[7] ................................................. G05D 23/13
(52) U.S. Cl. ............................................................ 236/12.2
(58) Field of Search ............................... 236/12.2, 12.21, 236/12.22

(56) References Cited

U.S. PATENT DOCUMENTS

| | | | | |
|---|---|---|---|---|
| 2,810,523 | * | 10/1957 | Branson | 236/12.2 |
| 3,765,604 | * | 10/1973 | Trubert et al. | 236/12.2 |
| 3,792,812 | * | 2/1974 | Knapp | 236/12.2 |
| 3,955,759 | * | 5/1976 | Knapp | 236/12.2 |
| 4,029,256 | * | 6/1977 | Dauga | 236/12.2 |
| 5,148,976 | * | 9/1992 | Reid | 236/12.2 |
| 5,203,496 | * | 4/1993 | Kline | 236/12.2 |
| 5,379,936 | * | 1/1995 | Kline | 236/12.2 |

* cited by examiner

Primary Examiner—William Tapolcai

(57) ABSTRACT

A thermostatic mixing valve having an inlet valve closure sleeve whose position relative to cold and hot water inlet valve seats is controlled by a temperature sensitive expansion element located in a mixing chamber. The closure sleeve is formed with a center body defining an annular gap through which water from the cold water inlet is channeled onto a baffle surface at the entrance to the mixing chamber. Water from the hot water inlet is also directed onto the baffle surface for turbulent mixing with water from the cold water inlet.

5 Claims, 1 Drawing Sheet

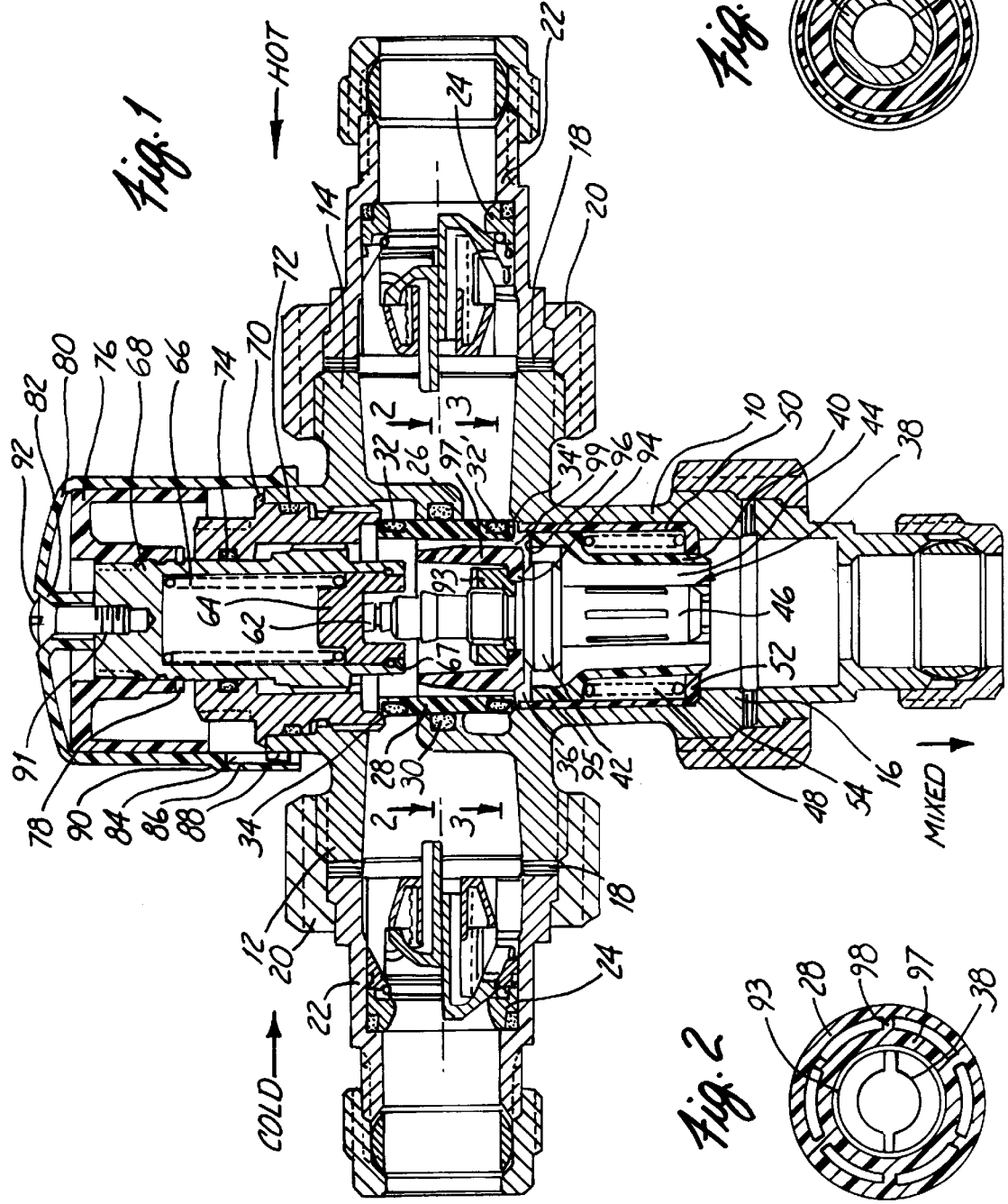

THERMOSTATIC WATER MIXER

BACKGROUND OF THE INVENTION

The present invention relates generally to thermostatic water mixing valves, and specifically to such valves internally configured to provide an improved mixing chamber from which water passes around a thermostatic expansion element to enhance output temperature stability.

Thermostatic valves which mix hot and cold water in varying proportions to supply water of a preset nominal temperature are well known. A common design for such valves incorporates two valve devices whose closure members are coordinately controlled by a thermostatic expansion element. The valve devices control admission of cold and hot water into a mixing chamber from which mixed cold and hot water flows past the thermostatic expansion element.

In known designs for valves of this type, the outlet water temperature is generally sensitive to the cold and hot water inlet pressures. Thus, the preset outlet temperature is accurately maintained only if the supply pressures of the cold and hot water are constant. Conversely, operation of an ideal mixing valve should be characterized by an outlet temperature that is independent of inlet pressures.

The foregoing problem is addressed in published German patent document DE 44 23 240 C1, which discloses a mixing valve having a baffle plate within its mixing zone. The present invention is directed to a design that further improves the outlet temperature response characteristics of a thermostatic mixing valve.

BRIEF SUMMARY OF THE INVENTION

The invention is a thermostatic water mixing valve that provides improved independence of outlet temperature from inlet pressure variations by incorporating a specially configured inlet valve closure sleeve in combination with a baffle surface downstream from the inlet valve seats. The inlet valve closure sleeve is formed with a concentric inner body that, together with the closure sleeve, defines an annular gap through which water is directed onto the baffle surface, and then into a mixing chamber at least partially surrounding a thermostatic expansion element that positions the sleeve relative to the inlet valve seats. A portion of the expansion element is located in a tubular support tapered along at least a portion of its length, the upstream end of which may form the baffle surface. The valve closure sleeve and inner body may be formed of plastic to inhibit the formation of scale deposits.

BRIEF DESCRIPTION OF THE DRAWING

FIG. 1 is a cross sectional view of a thermostatic water mixing valve having an improved mixing chamber in accordance with the present invention;

FIG. 2 is a cross sectional view of a portion of the valve of FIG. 1, taken along lines 2—2; and FIG. 3 is a cross sectional view of a portion of the valve of FIG. 1, taken along lines 3—3.

DETAILED DESCRIPTION OF THE INVENTION

As shown in the drawing, the thermostatic water mixing valve includes a housing 10 generally symmetrical with respect to a vertical plane, having a portion 12 defining an inlet for cold water and a portion 14 defining an inlet for hot water. Housing 10 also has a portion 16 defining an outlet perpendicular to the inlets. Adapters 22, containing backflow preventers 24, are connected to inlet portions 12 and 14 by means of internally threaded caps 20 within which are located sealing rings 18. Between the inlets, and concentric with an axis of symmetry perpendicular thereto, a guide ring 26 is pressed into housing 10, with which it forms an interference fit. An inlet valve closure sleeve 28 is mounted in guide ring 26 for sliding movement relative thereto along the axis of symmetry. An O-ring 30 provides a seal between guide ring 26 and valve closure sleeve 28.

Valve closure sleeve 28 is fitted at opposite ends with sealing rings 32 and 32' which form soft seals, and which cooperate with valve seats 34 and 34' formed in housing 10. The valve formed by sealing ring 32 and valve seat 34 controls the admission of cold water into a mixing chamber 36. Similarly, the valve formed by sealing ring 32' and valve seat 34' controls the admission of hot water into mixing chamber 36.

Valve closure sleeve 28 is formed with an inner tubular body 97 concentrically arranged with the remainder of the sleeve, and connected thereto by means of webs 98, as can be seen most clearly in FIG. 2. Sleeve 28, including inner body 97, is of molded plastic construction, so as to prevent the formation of scale deposits. Webs 98 are terminated short of the downstream end of sleeve 28 so as to form an annular gap 99 between inner body 97 and the outer portion of the sleeve, as shown in FIG. 3. Gap 99, in part, channels incoming cold water so that it is prevented from directly affecting a thermostatic expansion element 38 located within mixing chamber 36.

Thermostatic expansion element 38 is located within a tubular spring guide 40 which also serves as a support for the expansion element. In particular, expansion element 38 is configured with a bulge 42 of enlarged diameter which rests on inwardly extending radial ribs 44 within spring guide 40. Outwardly of bulge 42, spring guide 40 is formed with an enlarged collar 95 having an upstream face which forms a baffle surface 96. Baffle surface 96 is effective to create turbulence in the flow into mixing chamber 36 of cold water through gap 99 and hot water through valve seat 34'.

The inner contour of tubular spring guide 40 is generally parallel with the outer contour of expansion element 38. In particular, spring guide 40 is tapered to correspond with the outer contour of expansion element 38 to guide the mixed hot and cold water closely along the expansion element. Further, the internal contour of spring guide 40 is configured with a tapered transitional section in the region from bulge 42 to a downstream cylindrical portion 46 of expansion element 38.

A plastic sleeve 50 is inserted into housing 10, and abuts an inwardly extending shoulder 54 in housing 10. Sleeve 50, at its downstream end, is formed with an inwardly extending flange 52. A compression spring 48 extends between flange 52 and an external shoulder on spring guide 40, so as to positionally bias the spring guide in an upstream direction relative to the housing. The upstream end of sleeve 50 serves to limit downstream movement of valve closure sleeve 28.

Inner body 97, at its downstream end, is formed with an inwardly extending flange 94, against which bulge 42 of expansion element 38 is positioned. A nut 93 cooperates with outer threads on expansion element 38 to provide for clamping flange 94 between the nut and bulge 42.

Expansion element 38 includes an upwardly extending plunger 62 which abuts a contact piece 64 slideably mounted in a socket in a spindle 68. The socket contains a compression spring 66 which biases contact piece 64 out of spindle 68, the contact piece being retained in the socket by means of a snap ring 67. Spindle 68 is formed with external threads which cooperate with internal threads in a guide sleeve 70 which, in turn, is threaded into housing 10. O-rings 72 and 74 provide seals between housing 10 and sleeve 70, and between sleeve 70 and spindle 68, respectively.

A knurled knob 76 is mounted on spindle 68, and is axially positioned by means of abutment of the knob against a retaining ring 78. Knob 76 facilitates rotation and resulting axial movement of spindle 68 relative to housing 10, thereby permitting adjustment of the outlet setpoint temperature. In order to prevent unauthorized adjustment of the setpoint temperature, a transparent plastic cap 80 covers knob 76. Cap 80 is formed with an internal boss 82 by which the which the cap is supported on spindle 68. Cap 80 is also formed with an internal radial groove in a skirt 86 of the cap parallel with the axis thereof. Groove 84 cooperates with a corresponding rib 88 on housing 10 to prevent rotation of the cap. Rib 88 concurrently serves as an index mark for a setpoint temperature dial on knob 76. Skirt 86 is formed with an external projection 90 coincident with the internal groove 84 to further facilitate indication of the setpoint temperature.

Knob 76 is attached to spindle 68 by means of a countersunk screw 92 extending through internal boss 82. Screw 92 cooperates a threaded hole 91 in spindle 68 so as to permit cap 80 to be tightly affixed to the spindle. This arrangement reliably prevents rotation of spindle 68 relative to housing 10 since rotation of cap 80 relative to the housing is prevented through cooperation of groove 84 in the cap and the corresponding rib on the housing.

The above-described valve operates as follows when used as a mixing valve in hot water and heating installations. In such an application, expansion element 38, which is highly temperature sensitive and is located in the valve mixing chamber or outlet, controls the position of closure sleeve 28 as a function of the mixed water temperature. The position of closure sleeve 28, in turn, controls the relative proportions of cold and hot water admitted into the mixing chamber. Sealing ring 32' provides for tight closure of the hot water inlet valve if the cold water supply fails and/or the hot water temperature is 10° C. higher than the mixed water temperature. Conversely, upon failure of the hot water supply, the flow of cold water into the mixing chamber is reliably shut off.

The above-described thermostatic mixing valve may also be used as a distributing valve for heating applications such as hot water floor heat installations. In such applications, flow through the mixing valve is reversed from that in mixing valve applications. In particular, water enters the valve through the outlet, after which it affects the expansion element which controls the position of the closure sleeve in such a way that, at temperatures higher than the setpoint temperature water is caused to flow back into the heating installation, and at temperatures lower than the setpoint temperature water is directed through a boiler.

What is claimed is:

1. A thermostatic water mixing valve, comprising:

a housing defining an inlet for cold water, an inlet for hot water, and an outlet for mixed water, the inlets and the outlet being connected to a mixing chamber a valve seat arranged between each inlet and the mixing chamber;

a closure sleeve whose position relative to the valve seats is controlled by an expansion element located to be within the flow path of the mixed water, the expansion element being configured with a bulge;

an adjusting mechanism for changing the positional bias of the closure sleeve and the expansion element to provide a set point for the temperature of the mixed water;

an inner body arranged within and concentric with the closure sleeve forming an annular gap for passage of water into the mixing chamber; and a baffle surface adjacent the downstream end of the annular gap for promoting the mixing of cold water and hot water;

characterized in that:
   a) the expansion element is located within a spring guide that is tapered over a portion of its longitudinal extension and that supports the expansion element by means of internal radial ribs parallel with the longitudinal extension of the spring guide;
   b) the inner contour of the spring guide is matched to the outer contour of the expansion element and is substantially parallel thereto;
   c) the baffle surface is formed by the upstream end of the spring guide; and
   d) the spring guide is slideably mounted within a plastic sleeve and positionally biased relative thereto by a compression spring between the spring guide and the plastic sleeve.

2. A thermostatic water mixing valve according to claim 1, characterized in that the upstream end of the plastic sleeve serves to limit travel of the closure sleeve.

3. A thermostatic water mixing valve according to claim 2, characterized in that the closure sleeve is slideably mounted and carries inserted soft seals adjacent the valve seats.

4. A thermostatic water mixing valve according to claim 3, characterized in that the inner body is configured with an inwardly extending flange against which the bulge on the expansion element abuts, and a nut cooperates with an outer thread on the expansion element to provide for clamping the inwardly extending flange between the nut and the bulge.

5. A thermostatic water mixing valve according to any one of claims 1 through 4 operated as a distributing valve wherein water is supplied to the outlet for mixed water, and the inlets for cold water and hot water are connected with a heat source.

* * * * *